US006816775B2

(12) United States Patent
Barho et al.

(10) Patent No.: US 6,816,775 B2
(45) Date of Patent: Nov. 9, 2004

(54) METHOD FOR DETECTING MISFIRING IN A MULTI-CYLINDER INTERNAL COMBUSTION ENGINE

(75) Inventors: Hans Barho, Bad Duerrheim (DE); Helmut Gross, Kornwestheim (DE); Michael Lehner, Muehlacker (DE); Andrea Lohmann, Stuttgart (DE); Martin Bulla, Heilbronn (DE); Robert Seyfang, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 64 days.

(21) Appl. No.: 10/181,310

(22) PCT Filed: Jan. 12, 2001

(86) PCT No.: PCT/DE01/00117
§ 371 (c)(1),
(2), (4) Date: Oct. 28, 2002

(87) PCT Pub. No.: WO01/57381
PCT Pub. Date: Aug. 9, 2001

(65) Prior Publication Data
US 2003/0106529 A1 Jun. 12, 2003

(30) Foreign Application Priority Data
Jan. 14, 2000 (DE) .......................................... 100 01 284

(51) Int. Cl.[7] .......................... G01M 15/00; G06G 7/70; G06F 17/10

(52) U.S. Cl. ..................... 701/110; 73/116; 123/406.14; 123/436

(58) Field of Search ........................ 123/406.14, 406.47, 123/436; 73/116; 701/102, 103, 104, 110, 111

(56) References Cited

U.S. PATENT DOCUMENTS

| 5,035,220 A | 7/1991 | Uchinami et al. | 123/436 |
| 5,832,404 A | 11/1998 | Amano | 701/110 |
| 6,208,930 B1 * | 3/2001 | Uematsu | 701/110 |

* cited by examiner

Primary Examiner—Tony M. Argenbright
(74) Attorney, Agent, or Firm—Kenyon & Kenyon

(57) ABSTRACT

A method for detecting combustion misses in a multi-cylinder internal combustion engine. The control units of the engine use an engine control program which is interrupted by interrupt routines, in phase-synchronism with the rotational movement of the crankshaft, in which at least the data required for injection and firing are processed. The detection of combustion misses includes establishing and evaluating crankshaft segment times in which the crankshaft covers an associated circle-segment angle range. The crankshaft segment are also established and evaluated in particular interrupt routines, and for the further subset of cylinders in the interrupt routines in which their firing is controlled. Furthermore, the crankshaft segment times for the first cylinder is established and evaluated in certain additionally generated interrupt routines.

2 Claims, 1 Drawing Sheet

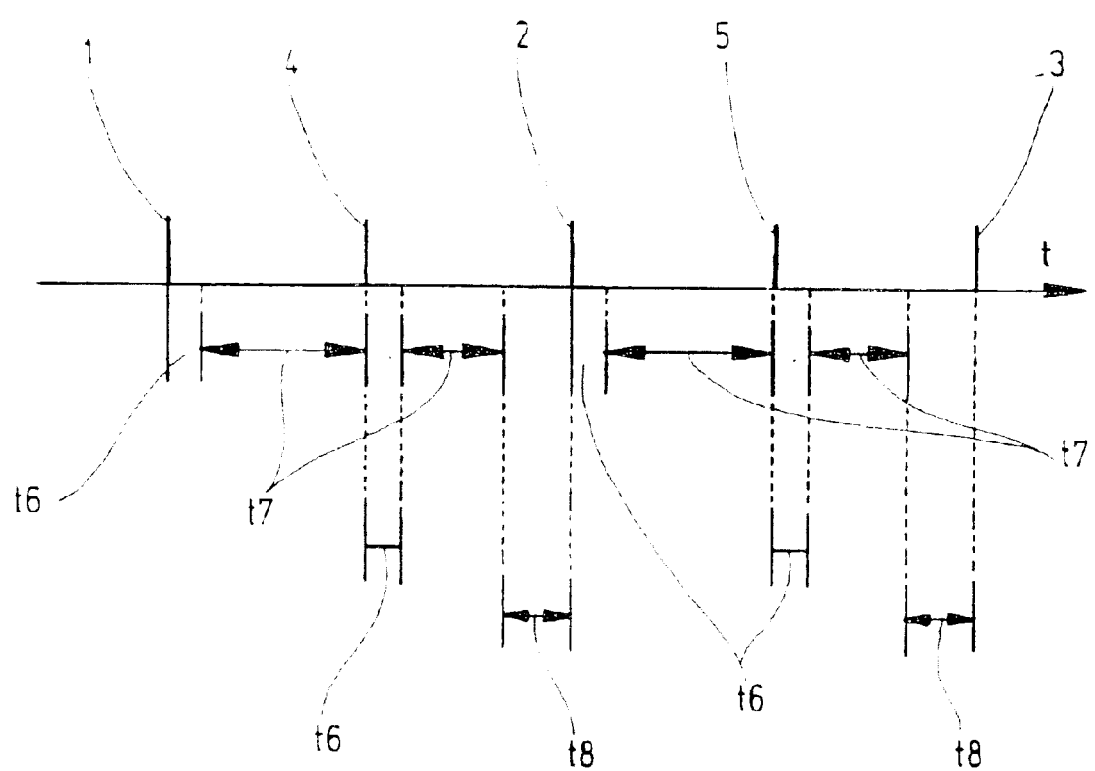

METHOD FOR DETECTING MISFIRING IN A MULTI-CYLINDER INTERNAL COMBUSTION ENGINE

The present invention relates to a method for detecting misfirings in a multi-cylinder internal combustion engine having the features indicated in the preamble of Claim 1.

BACKGROUND INFORMATION

Methods for detecting combustion misses having the features according to the species are generally known from the related art. The methods are essentially based on a comparison of values determined internally within the engine and pertaining to the irregular running of individual cylinders of the internal combustion engine to defined threshold values, and inferring a combustion miss in those cases where the detected irregular running values exceed the threshold value.

The irregular running values of individual cylinders relevant for detecting combustion misses are obtained by exploiting the knowledge that, in contrast to normal operation, an absent or incomplete combustion within a cylinder causes characteristic changes in the torque curve of the engine. By comparing the torque curves, i.e. the contribution made to the torque by individual cylinders, a distinction can then be made between normal, misfire-free operation of the internal combustion engine and the operation in which misfires occur. The differences in the torque characteristic are determined by calculating segment times, taking into account that a lower torque contribution, resulting from a misfire, causes longer segment times of the crankshaft, one crankshaft segment in each case corresponding to the piston movement of individual cylinders during the torque-producing expansion phase. The crankshaft segment times may be sampled via appropriate sensors, for instance at a trigger wheel mounted on the crankshaft or camshaft, on which the limits of the segment areas are marked. The crankshaft segment times are usually determined in synchronism with the firing and stored and analyzed in engine control units. In this case, the evaluation is carried out by calculating irregular running values from the determined crankshaft segment times, the irregular running values allowing the detection of combustion misses through a comparison of a setpoint value with a threshold value, where the exceeding of the established threshold value is interpreted as a combustion miss in the associated cylinder.

The described method for detecting combustion misses has generally been useful in the case of multi-cylinder internal combustion engines having a central engine control unit. However, in the case of engines having a high number of cylinders and a plurality of control units, the problem arises that the evaluation of irregular running values from consecutive segment times is extremely complicated, due to the fact that each control unit only serves a number of cylinders connected thereto, with only data from a subset of ignition output stages and fuel injectors being processed in each of the control units. Because the cylinders are distributed among a plurality of control units, the irregular running values from consecutive segment times can only be determined by a corresponding investment in memory and calculation and used for the detection of misfirings.

Furthermore, problems may occur in computing time.

For the purpose of illustration, an engine having two control units is considered, each controlling the firing and injection of one group of cylinders each, and in which the detection of combustion misses is integrated into one control unit. Hereinafter this control unit is also referred to as a diagnostic control unit.

The present invention distinguishes itself by an advantageous division of the computing time of the diagnostic CU between two firings within the cylinder group associated with this control unit.

In principle, the time interval between two such firings is sufficient to process the data from the first firing, to generate an additional interrupt which is assigned to a firing of the other control unit, to detect an associated segment time and to process it for detecting combustion misses.

Not only is an evaluation of the associated segment times for detecting misfires carried out in the interrupt routines of the cylinders whose firings are controlled by the diagnostic control unit. In addition, further functions, such as firing and fuel injection, are also calculated within the framework of these routines.

In contrast, in the routines of the interrupt, which are allocated to the firings of the other cylinders that are calculated by the second control unit, only segment times are detected and evaluated for the detection of combustion misses.

For that reason, the interrupt routines of the cylinders controlled by the diagnostic control unit are considerably longer in the time characteristic than those of the cylinders that are controlled by the second control unit.

It is problematic that the processing of the data from the first firing may require so much time that the further interrupt, given complete processing of the data from the first firing, does not occur in synchronism with the firing interrupt of the second control unit.

If the processing of the data from the first interrupt is interrupted and if precedence is given to the further interrupt occurring in synchronism, including calculation of its data, it may occur that the calculation results of the further interrupt are available before the calculation results of the first interrupt. In such a case, undesirable switches in the calculation sequence of the irregular running may result.

According to the present invention, the processing of data from the first firing is interrupted in order to trigger the further interrupt; after triggering the further interrupt, the associated segment time is detected in correct phase relation to the firing interrupt of the second CU and stored.

Thereupon,. the processing of data from the first firing is first completed before the irregular running value is calculated with the aid of the segment time of the further interrupt.

In this manner, it is advantageously assured that the irregular running value from the first firing is always present in the CU before the irregular running value from the immediately following firing interrupt of the second CU. Switches in the order or calculation of the irregular running are thereby avoided.

A further important advantage is that, due to the additional interrupts for those cylinders that are not connected to the diagnostic CU, the algorithm for detecting combustion misses, and thus the software implementation for designs having two control units, may largely correspond to the software implementation for one-control unit design.

Reason: The software used to evaluate the segment times is running in both interrupts, i.e., in the interrupts of the connected, and in the interrupts of the unconnected cylinders. If only the interrupt of the connected cylinders were present, the algorithm for detecting combustion misses and/or the software implementation for two-CU designs would need to be fundamentally changed, since segment times for two firings would then have to be analyzed within one interrupt routine.

With the aid of the additional interrupts, the running time of the interrupt routines of the connected cylinders may be shortened.

The design approach according to the present invention discloses in detail a method for detecting combustion misses in a multi-cylinder internal combustion engine having at least one first engine control unit, which controls at least the injection and firing of a first subset of the cylinders of the internal combustion engine; and having at least one additional engine control unit (diagnostic control unit), which controls the injection and firing of a further subset of cylinders and in which the detection of combustion misses for the first and the further subset(s) of cylinders is also carried out; the control units using an engine control program which is interrupted in phase-synchronism with the rotational movement of the crankshaft by employing interrupt routines in which at least those data are processed that are required for the injection and firing. Furthermore, in this method the detection of combustion misses is based on establishing and evaluating crankshaft segment times in which the crankshaft covers an associated circle-segment angular range, and the crankshaft segment times likewise being established and evaluated in certain interrupt routines, the crankshaft segment times for the further subset of cylinders being established and evaluated in the interrupt routines in which their firings is controlled, and the crankshaft segment times for the first cylinders being established and evaluated in certain, additionally generated interrupt routines.

In those cases where the crankshaft segment time of one of the first cylinders must be detected in phase-synchronism with the engine rotation, and the interrupt routine of the further cylinder previous in the firing sequence is not yet completed, in one advantageous embodiment, the incomplete interrupt routine of the further cylinder previous in the firing sequence is interrupted, the crankshaft segment time of the one of the first cylinders is detected and stored, the incomplete interrupt routine of the further cylinder previous in the firing sequence is processed, and only then is the crankshaft segment time of the one of the first cylinders processed for the detection of combustion misses.

ADVANTAGES OF THE INVENTION

The method of the present invention for detecting combustion misses in multi-cylinder internal combustion engines having the features as recited in Claim 1 has the advantage over the known related art that a reliable detection of combustion misses may be ensured, even when using at least two engine control units, each processing data from a subset of the cylinders for firing and injection during the operation of the internal combustion engine; no complicated data detection and data evaluation in different control units are required. Since the crankshaft segment times needed for detecting combustion misses are detected, stored and evaluated in one of the engine control units for all of cylinders of the internal combustion engine, no data transfer between individual engine control units is required any longer. The detection, storing and evaluation of the crankshaft segment times are carried out in the relevant control unit, first of all, by generating firing interrupts of the cylinders connected to the control unit, and, secondly, by generating mathematically calculated interrupts, occurring in time between these firing interrupts, for those cylinders which are assigned to one or more other engine control units. By this measure, the segment times of consecutively occurring firings are available in one control. unit for the algorithm used in misfire detection through evaluation of the irregular running of individual cylinders, and can be evaluated in this manner without any problem.

The interrupt(s) determined arithmetically, occur during generation in the control unit which is used to detect combustion misses, simultaneously with the firing interrupts of the particular control unit which controls the instantaneously firing cylinder.

Particularly advantageous embodiments of the method according to the present invention result from an overall view of the technical teachings in Claim 1 with the features of the subclaims.

In order to ensure that the calculation sequence of the combustion miss detection is not mixed up during the interruption of the firing interrupt by the mathematically calculated, additionally generated interrupt, it has proven useful if the mathematically generated interrupts interrupt the actual firing interrupt only in order to establish and store the segment time. Processing of the data of the mathematically generated interrupt is only carried out after complete processing of the data from the normal firing interrupt. Thus, the method according to the present invention makes it possible to implement the calculation sequence for detecting combustion misses in one of the engine control units, independent of the number of engine control units used for the control of an internal combustion engine, so that the method of the present invention is universally applicable.

DRAWING

Hereinafter, the sequences of the method according to the present invention, especially as they pertain to the generation of firing interrupts and mathematically generated interrupts, as well as the time sequence for the segment times required in the detection of combustion misses, are explained with the aid of a schematic flow chart. In the included drawing, the sequence is shown using the examples of a design having two control units.

DESCRIPTION OF THE METHOD ACCORDING TO THE PRESENT INVENTION

In the included drawing, a horizontal time line is depicted and designated as "t". Above this time line t, three firing interrupts generated inside an engine control unit are marked by vertical notations 1, 2 and 3, each of firing interrupts 1, 2 and 3 corresponding to one of the ignition pulses, controlled by the control unit in question, of a cylinder assigned to this control unit. Between firing interrupts 1, 2 and 3 in the drawing can be seen designations 4 and 5, which indicate the moment of mathematical interrupts, the moments of the mathematical interrupts conforming with the firing interrupts generated simultaneously in the other control unit of the respective cylinder connected thereto. Not only after the firing interrupts, but also after the mathematical interrupts generated in between, a time span t6 can be seen from the FIGURE, during which the crankshaft segment time, which is required as a base value for the combustion miss detection, is ascertained and stored. When viewing the time span between firing interrupt 1 and firing interrupt 2, it becomes clear from the FIGURE that first, after calculation and storing of the segment time during time span t6, the data processing of the firing-synchronous interrupt is carried out within an ensuing time span t7. Time span t7 is interrupted once in order to detect and store the segment time of mathematically calculated interrupt 4. As can be seen from the FIGURE, the time span between two sequentially occurring firing interrupts 1 and 2 is longer than actual data processing time span t7. Thus, a time span t8 remains between the end of processing time t7 and the next firing interrupt, during which the evaluation of the segment time 5 associated with mathematically calculated interrupt 4 can be carried out. Consequently, while the time span of the firing interrupt is interrupted by the mathematically determined interrupt, this only occurs in order to establish and store the segment time. The processing o the mathematically calculated interrupts is carried out only after the complete processing of the actual firing interrupt.

What is claimed is:

1. A method for detecting combustion misses in a multi-cylinder internal combustion engine which includes at least one first engine control unit which controls at least the injection and firing for a first subset of cylinders of the internal combustion engine, and at least one additional engine control unit which controls the injection and firing of a second subset of cylinders of the internal combustion engine, the method comprising the steps of:

detecting combustion misses for the first subset of cylinders and the second subset of cylinders;

processing at least data required for injection and firing, using an engine control program which is interrupted by interrupt routines, in phase-synchronism with the rotational movement of the crankshaft; and establishing and evaluating crankshaft segment times in which crankshaft covers an associated circle-segment angle range;

wherein the establishing and evaluating of the crankshaft segment times are carried out in selected interrupt routines, and wherein the establishing and evaluating the crankshaft segment times for the second subset of cylinders occur in the interrupt routines in which firing of the second subset of cylinders is controlled, and wherein establishing and evaluating of the crankshaft segment times for the first subset of cylinders occur in selected additional interrupt routines.

2. The method according to claim 1, wherein in detecting the crankshaft segment time of one of the first cylinders in phase-synchronism with the engine rotation, if the interrupt routine of another cylinder preceding in the firing sequence is not yet completed, then:

interrupting the still incomplete interrupt routine of the another cylinder preceding in the firing sequence;

detecting and storing the crankshaft segment time of the one of the first cylinders;

completing the incomplete interrupt routine of the another cylinder preceding in the firing sequence; and processing the crankshaft segment time of the one of the first cylinders for the detecting of combustion misses.

* * * * *

UNITED STATES PATENT AND TRADEMARK OFFICE
CERTIFICATE OF CORRECTION

PATENT NO. : 6,816,775 B2
DATED : November 9, 2004
INVENTOR(S) : Hans Barho et al.

It is certified that error appears in the above-identified patent and that said Letters Patent is hereby corrected as shown below:

Column 1,
Line 4, insert -- FIELD OF INVENTION --
Line 6, change "engine" to -- engine. --
Line 7, delete "having...Claim 1."
Line 8, change "BACKGROUND INFORMATION" to -- BACKGROUND OF THE INVENTION --

Column 2,
Lines 4, 44, 51, 52, 57 and 66, change "CU" to -- control unit --
Line 16, change "such as" to -- for example --
Line 46, change "Thereupon,." to -- Thereupon --
Line 55, change "A further" to -- Another --
Line 55, change "advantage is" to -- advantage of present invention is --

Column 3,
Line 37, change "advantageous" to -- exemplary --
Line 45, change "ADVANTAGES" to -- SUMMARY --
Line 49, delete "having the features as recited in Claim 1"
Line 50, change "the known related art" to -- the prior art in --

Column 4,
Lines 11-14, delete "Particularly advantageous...of the subclaims."
Line 31, change "DRAWING" to -- BRIEF DESCRIPTION OF THE DRAWING --
Lines 33-43, change "Hereinafter, the sequences.....THE PRESENT INVENTION" to -- FIG. 1 shows a sequence of the method in accordance with the present invention. --
Line 44, change "In the included drawing," to -- As shown in FIG. 1, --
Lines 57-58, change "can be seen from the FIGURE," to -- is shown in FIG. 1 --
Line 62, change "the FIGURE" to -- FIG. 1 --
Line 67, change "As can be seen from the FIGURE," to -- Also shown in FIG. 1 --

UNITED STATES PATENT AND TRADEMARK OFFICE
CERTIFICATE OF CORRECTION

PATENT NO. : 6,816,775 B2
DATED : November 9, 2004
INVENTOR(S) : Hans Barho et al.

It is certified that error appears in the above-identified patent and that said Letters Patent is hereby corrected as shown below:

Column 5,
Line 1, change "As can be seen from the FIGURE," to -- Also shown in FIG. 1 --
Line 6, change "with mathematically" to -- with the mathematically --
Line 10, change "o" to -- of --

Signed and Sealed this

Twelfth Day of July, 2005

JON W. DUDAS
*Director of the United States Patent and Trademark Office*